(12) United States Patent
Hwang et al.

(10) Patent No.: US 9,971,483 B2
(45) Date of Patent: May 15, 2018

(54) CONTEXTUAL-BASED REAL-TIME TEXT LAYOUT CONVERSION CONTROL AND MANAGEMENT ON A MOBILE ELECTRONIC DEVICE

(71) Applicant: INTERNATIONAL BUSINESS MACHINES CORPORATION, Armonk, NY (US)

(72) Inventors: Inseok Hwang, Austin, TX (US); Su Liu, Austin, TX (US); Eric J. Rozner, Austin, TX (US); Chin Ngai Sze, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days. days.

(21) Appl. No.: 15/165,701

(22) Filed: May 26, 2016

(65) Prior Publication Data

US 2017/0344207 A1    Nov. 30, 2017

(51) Int. Cl.
*G06F 17/21*    (2006.01)
*G06F 3/048*    (2013.01)
*G06F 3/0484*    (2013.01)
*G06F 3/0488*    (2013.01)

(52) U.S. Cl.
CPC .......... *G06F 3/0484* (2013.01); *G06F 3/0488* (2013.01); *G06F 17/212* (2013.01)

(58) Field of Classification Search
CPC ........................... G06F 3/04883; G06F 3/0346
See application file for complete search history.

(56) References Cited

U.S. PATENT DOCUMENTS

| | | | |
|---|---|---|---|
| 7,721,222 B1 | 5/2010 | Shaik | |
| 8,958,823 B2* | 2/2015 | Ortiz | H04W 4/02 370/328 |
| 9,087,337 B2 | 7/2015 | Ho et al. | |
| 2005/0183033 A1 | 8/2005 | Feinberg et al. | |
| 2006/0262136 A1* | 11/2006 | Vaisanen | G06F 3/0485 345/619 |
| 2009/0038004 A1* | 2/2009 | Blasko | G06F 21/32 726/20 |
| 2010/0035613 A1* | 2/2010 | Schroter | H04M 1/72572 455/435.1 |
| 2012/0120000 A1* | 5/2012 | Lucic | G06F 1/1626 345/173 |

(Continued)

OTHER PUBLICATIONS

Daemon definition, Linfo.org, pp. 1-2 https://web.archive.org/web/20130102210500/http://www.linfo.org/daemon.html.*

(Continued)

*Primary Examiner* — Scott Baderman
*Assistant Examiner* — Mario M Velez-Lopez
(74) *Attorney, Agent, or Firm* — Griffiths & Seaton PLLC

(57) ABSTRACT

Various embodiments for real-time text layout conversion control on a mobile electronic device, by a processor device, are provided. On a mobile electronic device having a touch-screen display, a set of text layout conversion control signals are defined and associated with at least one of a plurality of contextual attributes, for text layout conversion management. Upon recognition of the at least one of the plurality of contextual attributes, a text layout is dynamically converted and re-rendered for presentation on the touch-screen display.

18 Claims, 7 Drawing Sheets

(56) References Cited

U.S. PATENT DOCUMENTS

| | | | |
|---|---|---|---|
| 2012/0185788 A1* | 7/2012 | Fong | G06F 3/018 715/765 |
| 2013/0127703 A1* | 5/2013 | Wendt | G06F 3/04847 345/156 |
| 2013/0249810 A1* | 9/2013 | Almosnino | G06F 3/04886 345/173 |
| 2014/0363074 A1* | 12/2014 | Dolfing | G06K 9/00979 382/156 |
| 2014/0363083 A1* | 12/2014 | Xia | G06K 9/00436 382/189 |
| 2015/0149882 A1 | 5/2015 | Hsu | |
| 2015/0234812 A1* | 8/2015 | Vukosavljevic | G06F 17/289 704/2 |
| 2016/0054914 A1* | 2/2016 | Di Censo | G06F 3/04883 345/173 |
| 2016/0259989 A1* | 9/2016 | Jordan | G06K 9/3208 |
| 2016/0282988 A1* | 9/2016 | Poupyrev | D03D 1/0088 |
| 2017/0003746 A1* | 1/2017 | Anglin | G06F 3/017 |

OTHER PUBLICATIONS

U.S. Appl. No. 15/165,561, filed May 26, 2016 (36 pages).
List of IBM Patents or Patent Applications Treated as Related dated Jul. 14, 2016 (2 pages).
Ying Liu, "Chinese Text Entry with Mobile Devices," Academic Dissertation in Interactive Technology, University of Tampere, 2010 (157 pages).

\* cited by examiner

CONTEXTUAL-BASED REAL-TIME TEXT LAYOUT CONVERSION CONTROL AND MANAGEMENT ON A MOBILE ELECTRONIC DEVICE

BACKGROUND OF THE INVENTION

Field of the Invention

The present invention relates generally to mobile electronic devices and more specifically to text layout conversion management on a mobile electronic device having a touch-screen display.

Description of the Related Art

Mobile electronic devices are an integral part of modern life. Notebooks, tablet computers, smart phones and other portable devices comprise more than half of all computers produced worldwide. People use them to communicate, work, relax, and study. Social applications are particularly popular on mobile electronic devices such as smart phones because they provide convenience and cost-effective ways to communicate and share information in the digital age. Billions of messages are sent via social applications everyday on mobile electronic devices between users, all around the world.

SUMMARY OF THE INVENTION

Various embodiments for real-time text layout conversion control on a mobile electronic device, by a processor device, are provided. On a mobile electronic device having a touch-screen display, a set of text layout conversion control signals are defined and associated with at least one of a plurality of contextual attributes, for text layout conversion management. Upon recognition of the at least one of the plurality of contextual attributes, a text layout is dynamically converted and re-rendered for presentation on the touch-screen display.

In addition to the foregoing exemplary embodiment, various other system and computer program product embodiments are provided and supply related advantages. The foregoing Summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
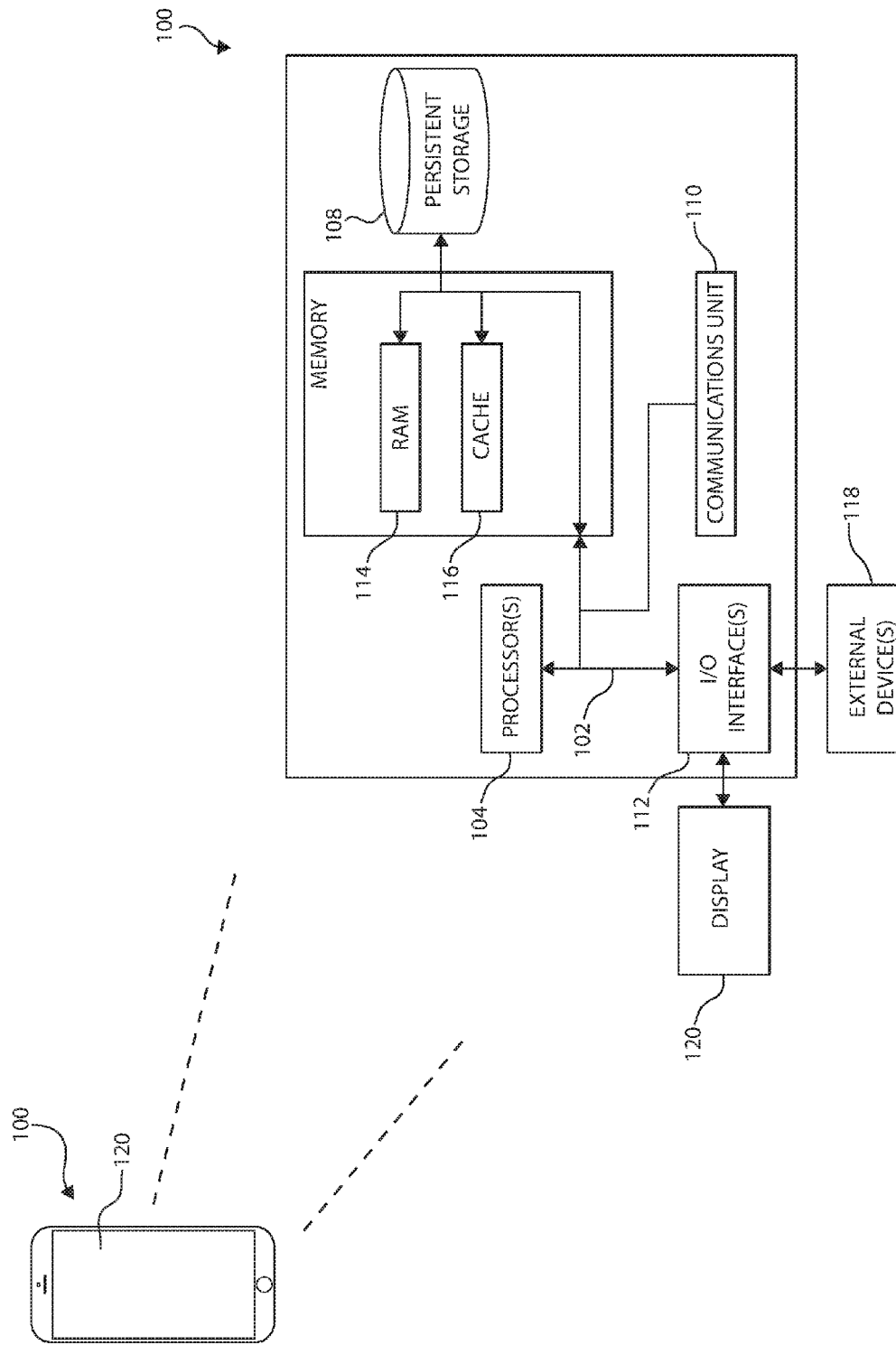
FIG. 1 is a block diagram showing a hardware structure of a mobile electronic device, in which aspects of the present invention may be realized.

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

As aforementioned, mobile electronic devices are an integral part of modern life. Notebooks, tablet computers, smart phones and other portable devices comprise more than half of all computers produced worldwide. People use them to communicate, work, relax, and study. Social applications are particularly popular on mobile electronic devices such as smart phones because they provide convenience and cost-effective ways to communicate and share information in the digital age. Billions of messages are sent via social applications everyday on mobile electronic devices between users, all around the world.

Many of these users send or receive messages in a non-English driven format. For example, vertical text layout is a traditional way to write and print text in some Eastern Asian languages, such as Chinese and Japanese. Oppositely to a horizontal text layout, in the vertical text layout, text flows from top to bottom, and right to left across a page. The text begins at the top-right corner of the page and flows downward, wrapping to the next line at the top of the page and to the left of the previous line. The vertical text layout is commonly used in newspapers, journals, books, and especially is more popular than the horizontal text layout for rendering Chinese couplets and poems.

On mobile electronic devices, such as smart phones, several methods have been proposed to support vertical text formatting for presentation on the display of the mobile electronic device. One method incorporates bitmaps which contain text in a vertical layout and are produced and edited using an image or slide editor (e.g. Adobe® Photoshop™). Another method employs cascading style sheets (CCS) to provide tags specifically for vertical text layout.

The underlying deficiency with both of the aforementioned methods, and others, is that they are specifically employed and supported in web browsers, such as Microsoft® Internet Explorer™. Currently, no reliable method exists for supporting real-time horizontal to vertical text layout conversion in a social application (e.g. chat/message box) on a mobile electronic device, such as a smartphone having a touch-screen display.

Accordingly, and in view of the foregoing, a method is contemplated for real-time text layout conversion on a mobile electronic device, specifically suited to social messaging applications. The mechanisms provided herein include such functionality as defining a set of text layout conversion control patterns, recognizing a text layout conversion control signal, converting a text layout based upon a recognized text layout conversion control signal associated with a defined text layout conversion control pattern, and re-rendering the text layout accordingly, as will be further described. It should be noted that throughout the present disclosure that "social applications" are widely referenced (e.g. text messaging/chat applications). However, one skilled in the art would widely recognize the mechanisms provided herein may apply to a wide variety of documents, advertisements, pages, etc. and should not be limited by the specific examples provided herein.

Turning first to FIG. 1, a block diagram showing a hardware structure of a mobile electronic device 100 is illustrated. It should be appreciated that FIG. 1 provides only an illustration of one implementation and does not imply any limitations with regard to the environments in which different embodiments may be implemented. Many modifications to the depicted environment may be made.

Mobile electronic device 100 includes communications fabric 102, which provides communications between computer processor(s) 104, memory 106, persistent storage 108, communications unit 110, and input/output (I/O) interface(s) 112. Communications fabric 102 can be implemented with any architecture designed for passing data and/or control information between processors (such as microprocessors, communications and network processors, etc.), system memory, peripheral devices, and any other hardware components within a system. For example, communications fabric 102 can be implemented with one or more buses.

Memory 106 and persistent storage 108 are computer-readable storage media. In one embodiment, memory 106 includes random access memory (RAM) 114 and cache memory 116. In general, memory 106 can include any suitable volatile or non-volatile computer-readable storage media.

The functionality described herein may be provided via an application(s) or module(s) stored in persistent storage 108 of mobile electronic device 100 for execution and/or access by one or more of the respective computer processors 104 via one or more memories of memory 106 of mobile electronic device 100. In one embodiment, persistent storage 108 includes a magnetic hard disk drive. Alternatively, or in addition to a magnetic hard disk drive, persistent storage 108 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 108 may also be removable. For example, a removable hard drive may be used for persistent storage 108. Other examples include optical and magnetic disks, thumb drives, and smart cards that are inserted into a drive for transfer onto another computer-readable storage medium that is also part of persistent storage 108.

Communications unit 110, in these examples, provides for communications with other servers, data processing systems, or devices. In these examples, communications unit 110 includes one or more network interface cards. Communications unit 110 may provide communications through the use of either or both physical and wireless communications links.

I/O interface(s) 112 allows for input and output of data with other devices that may be connected to mobile electronic device 100. For example, I/O interface 112 may provide a connection to external devices 118 such as a keyboard, keypad, a touch screen, and/or some other suitable input device. External devices 118 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 108 of mobile electronic device 100 via I/O interface(s) 112. I/O interface(s) 112 may also connect to a display 120. Display 120 provides a mechanism to display data to a user and may be, for example, a computer monitor or a touch screen.

Figure 2:
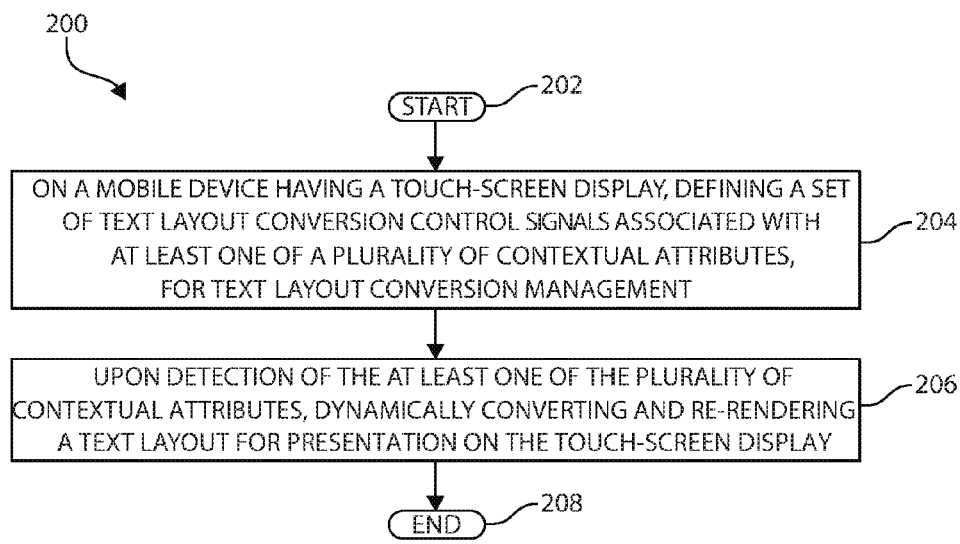
FIG. 2 is a high-level flow chart diagram illustrating a method for real-time text layout conversion control in accordance with various aspects of the present invention.

Advancing to FIG. 2, a generalized method 200 for real-time text layout conversion control on a mobile electronic device, in accordance with one embodiment of the present invention. The method 200 may be performed in accordance with the present invention in any of the environments depicted in FIG. 1, among others, in various embodiments. Of course, more or less operations than those specifically described in FIG. 2 may be included in method 200, as would be understood by one of skill in the art upon reading the present descriptions.

Each of the steps of the method 200 may be performed by any suitable component of the operating environment. For example, in various embodiments, the method 200 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 200. Illustrative processors include, but are not limited to, a Central Processing Unit (CPU), an Application Specific Integrated Circuit (ASIC), a Field Programmable Gate Array (FPGA), etc., combinations thereof, or any other suitable computing device known in the art.

Beginning (step 202), on a mobile electronic device having a touch-screen display, a set of text layout conversion control signals are defined and associated with at least one of a plurality of contextual attributes, for text layout conversion management (step 204). Upon recognition of the at least one of the plurality of contextual attributes, a text layout is dynamically converted and re-rendered for presentation on the touch-screen display (step 206). The method ends (step 208).

Figure 3:
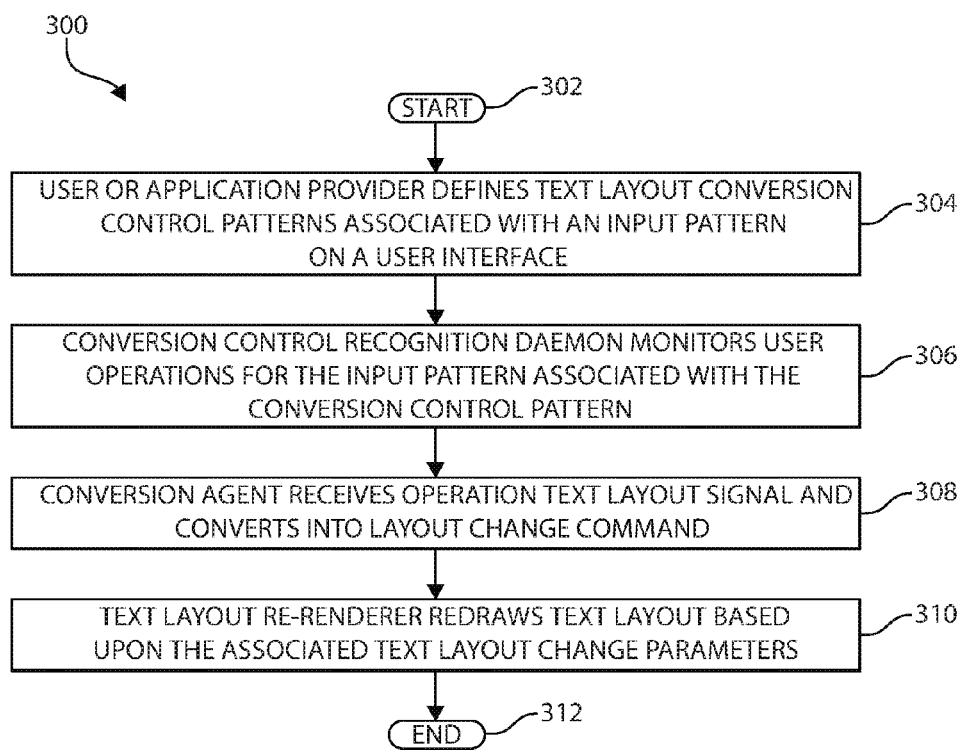
FIG. 3 is an additional flow chart diagram illustrating a method for real-time text layout conversion control in accordance with various aspects of the present invention.

FIG. 3 is an additional flow chart diagram illustrating a generalized method 300 for real-time text layout conversion control in accordance with various aspects of the present invention. The method 300 may be performed in accordance with the present invention in any of the environments depicted in FIG. 1, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a Central Processing Unit (CPU), an Application Specific Integrated Circuit (ASIC), a Field Programmable Gate Array (FPGA), etc., combinations thereof, or any other suitable computing device known in the art.

Beginning (step 302), a user or application provider defines and saves a set of text layout conversion control patterns associated with an input control gesture or pattern on a user interface (step 304). A text layout conversion control recognition daemon monitors user operations on the mobile electronic device 100 for the input control gesture or pattern associated with the defined and saved text layout conversion control pattern (step 306). A text layout conversion agent receives an operation text layout signal and converts the signal into a text layout change command (step 308). A text layout re-renderer receives the text layout change command and redraws the text layout based upon the associated text layout change parameters (step 310). The method ends (step 312).

As aforementioned, the present invention employs multiple components in order to receive a predefined gesture pattern from a user on the display 120 of the mobile electronic device 100, match the predefined gesture pattern with a saved gesture pattern, and trigger a corresponding text layout change based upon the association. The components of the present invention are defined as follows:

Text Layout Manager (TLM): The text layout manager comprises a user interface to manage text layout configurations, control types and patterns, and user preference settings. All configured patterns and settings can be saved into a system profile.

Text Layout Conversion Control Recognition Daemon (TLCCRD): The text layout conversion control recognition daemon comprises a software module to monitor user gesture operations (e.g. fingertip movements or shaking device), and pass correlated event signals to the text layout conversion agent.

Text Layout Conversion Agent (TLCA): The text layout conversion agent comprises an application or application programming interface (API) to receive operation text layout signals; search a correlated text layout type from text layout conversion control patterns (TLCCP); convert the received text layout signal into a layout change command; and send a specific layout change command to a text layout re-renderer.

Text Layout Re-renderer (TLRR): The text layout re-renderer comprises an application, an API, or device to redraw the text layout based on the correlated text layout change parameters. The text layout re-renderer may further comprise a switch layout engine to convert related matrix of content data in layout buffer, change/update bidirectional index and parameters, and switch related fonts as needed.

Text Layout Conversion Control Patterns (TLCCP): The text layout conversion control patterns are a set of control patterns either defined by application providers, or created/customized by users.

In some embodiments, text layout conversion control patterns may be defined as gesture patterns of directional fingertip movements on the display 120 of the mobile electronic device 100, such as:

Sliding a fingertip left-to-right for changing text layout from left-right layout direction to right-to-left layout direction;

Sliding a fingertip right-to-left for changing text layout from right-left layout direction to left-to-right layout direction;

Sliding a fingertip left-top to right-bottom for changing text layout from a horizontal layout to a vertical layout; and Sliding a fingertip right-bottom to left-top for changing text layout from a vertical layout to a horizontal layout.

Additionally, or alternatively, in some embodiments, text layout conversion control patterns may be defined as gesture patterns of directional shaking movements of the mobile electronic device 100, such as:

Shaking the device from left-to-right for changing text layout from a left-right layout direction to a right-left layout direction;

Shaking the device from right-to-left for changing text layout from a right-left layout direction to a left-right layout direction;

Shaking the device up and down for changing text layout from a horizontal layout to a vertical layout; and Shaking the device to the left and subsequently to the right for changing text layout from a vertical layout to a horizontal layout.

It should be noted that the foregoing only provides a few simplistic examples of gesture patterns which may be defined and saved for changing the text layout direction for presentation on the display 120 of the mobile electronic device 100. In an actual implementation, any number of gesture patterns may be assigned. For example, instead of sliding one fingertip across the display 120 of the mobile electronic device 100, a gesture pattern of sliding two or three fingers across the display may be employed, and in a variety of directional movements. Additionally, any number of touchless gestures, biometric control signals, and recognition methods may be employed on the mobile electronic device 100 for signaling the text layout conversion and re-render embodiments described herein.

Figure 4:
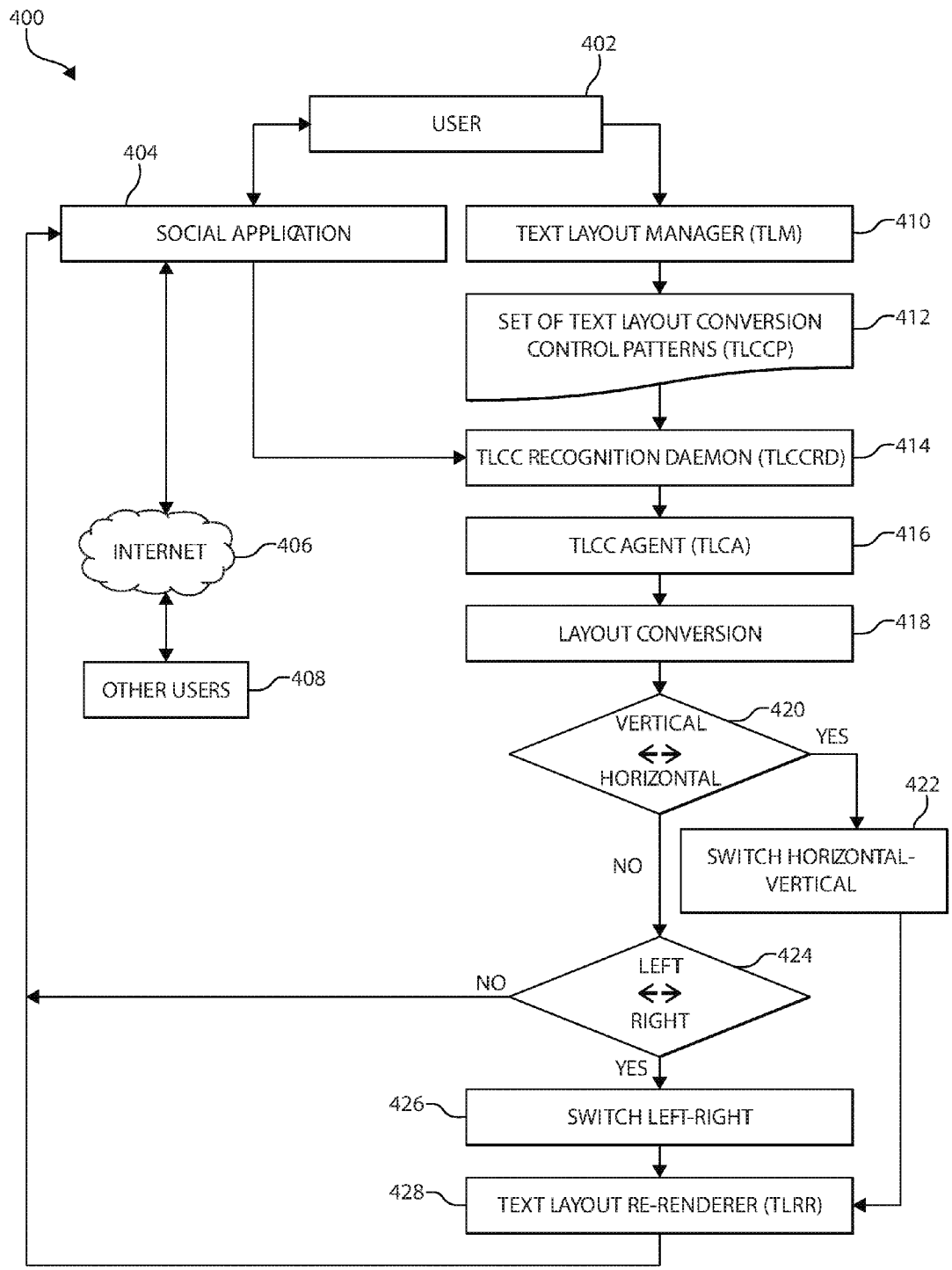
FIG. 4 is a block diagram illustrating a high-level view of a method for real-time text layout conversion control in accordance with various aspects of the present invention.

Continuing, FIG. 4 is a block diagram illustrating a high level view 400 of a method for real-time text layout conversion control in accordance with various aspects of the present invention. The high level view 400 includes user 402, the user comprising the mobile electronic device 100, in communication with a social application 404. The social application 404 is in communication with the Internet 406, which thus provides a network connection to other users (i.e. other mobile electronic devices) 408.

The user 402 uses the text layout manager 410 to define and manage text layout configurations, text layout conversion control patterns, and user preference settings. As aforementioned, all configured text layout conversion control patterns 412 may be saved to a system or user profile. The text layout conversion control recognition daemon 414 monitors user operations (such as predefined gesture movements of fingertip or shaking patterns) and passes correlated event signals to the text layout conversion agent 416. Additionally, the text layout conversion control recognition daemon 414 is in communication with the social application 404 and may monitor for contextual based, timing based, or geo-location based textual inputs.

The text layout conversion agent 416 then receives input signals generated by the user 402 on the mobile electronic device 100 and searches correlated text layout modifications based upon a matched text layout conversion control pattern which has been predefined 418. If the recognized text layout conversion control pattern generated from the user 404 input corresponds to a vertical/horizontal text layout conversion 420, a signal is sent for the text to be re-rendered in the appropriate format 422. If, the text layout conversion control pattern is not matched to a vertical/horizontal text layout conversion but rather a left/right directional text layout conversion 424, a signal is sent for the text to be re-rendered in the appropriate left/right textual layout 426. If neither condition applies, that is, if neither a vertical/horizontal nor a left/right text layout conversion control pattern is recognized, no change is applied in the social application 404.

Upon recognizing the text layout conversion command provided by either a left/right text layout conversion control pattern 426 or a horizontal/vertical text layout conversion control pattern 422, the text layout re-renderer redraws the text layout based upon the corresponding command and presents the converted and re-rendered text within the social application 404.

It should be noted, as eluded to above, that many variations exist in providing the text layout conversion techniques provided by the present invention. For example, in one embodiment, a conversion service type may be recognized and employed such that text layout conversions are made in a proactive or a reactive way. Stated differently, the text layout conversion may be performed proactively upon recognizing certain predefined factors and automatically convert the text layout in an appropriate, predefined manner. Otherwise, the text layout conversion may be performed reactively, such as upon recognizing the predefined text layout conversion control patterns as previously discussed.

Moreover, variations in the conversion signals generated to trigger a textual layout conversion may be employed. In one embodiment, the fingertip or shaking gestures may be employed upon the mobile electronic device 100 as discussed, however, in other embodiments, textual layout conversions may be performed upon the mobile electronic device recognizing that it is within a certain boundary such as a geo-location. In some embodiments, textual layout conversions may be performed upon recognizing a contextual based message such as a vertical-sensitive topic, poem, couplet, etc. These contextual attributes (e.g. the geo-location, vertical-sensitive message content, etc.) are processed substantially the same as a recognition of a specific fingertip or shake gesture as mentioned above, with the exception that instead of the predefined input gesture, the contextual attributes trigger the text layout conversion process as previously discussed.

Furthermore, the textual conversion may be processed in a variation of ways. In one embodiment, for example, a sender of a given message may control the orientation of the text layout provided between a conversation of a sender and receiver. In another embodiment, a receiver of the conversation may control the text layout of the conversation. In still other embodiments, a centralized server-side control may be implemented in controlling the format and orientation of the text layout between a sender and receiver.

Figure 5:
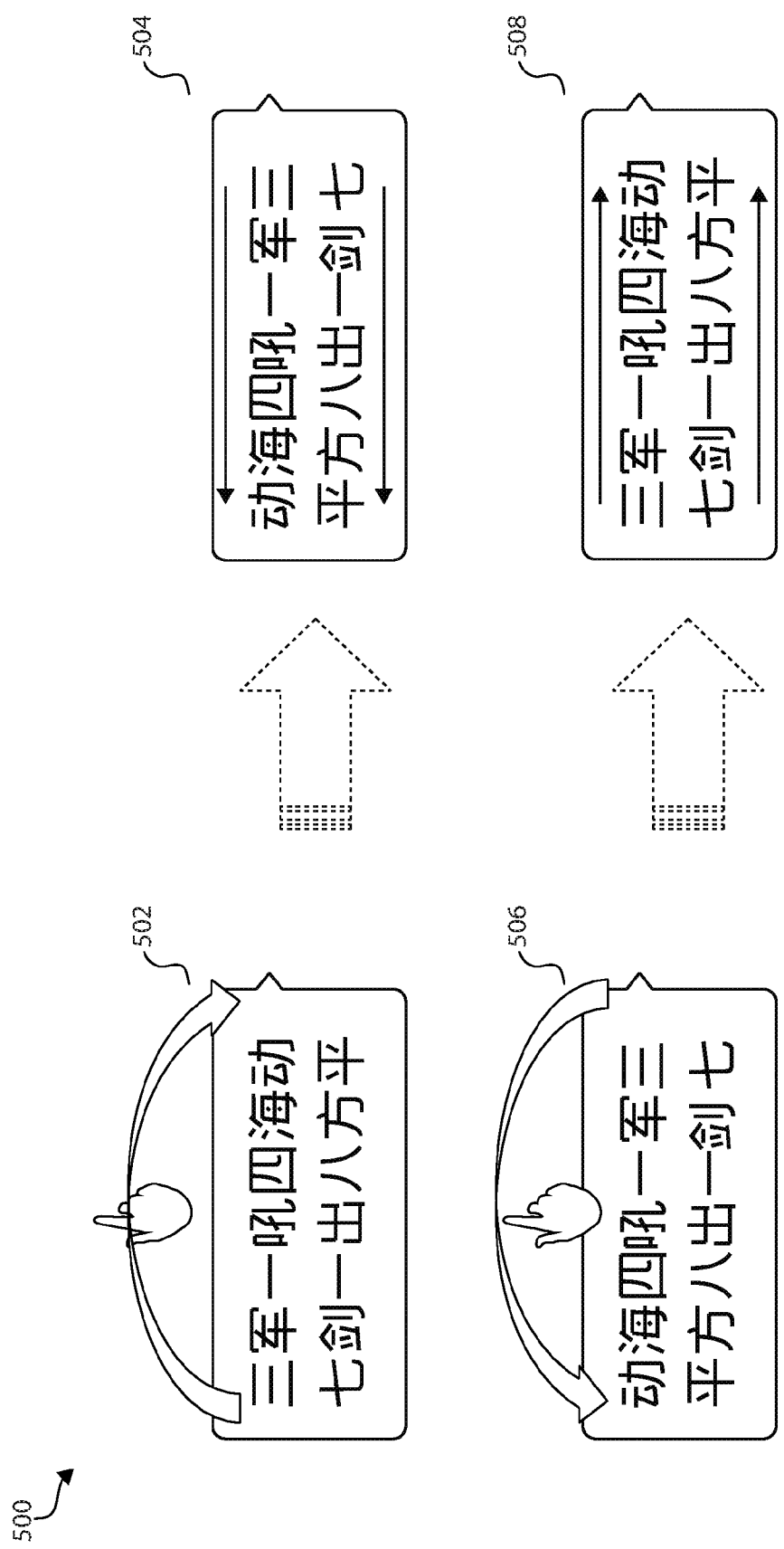
FIG. 5 is a block diagram illustrating gesture patterns for real-time text layout conversion control in accordance with various aspects of the present invention.

Advancing now to FIG. 5, a block diagram illustrating gesture patterns 500 for real-time text layout conversion control is depicted. Message 502 shows that when a directional fingertip gesture movement is provided from left-to-right on the display 120 of the mobile electronic device 100, a conversion is performed and the text layout is re-rendered from a right-to-left format to a left-to-right format in message 504 using the process discussed above. Similarly, message 506 shows that when a directional fingertip gesture movement is provided from right-to-left on the display 120 of the mobile electronic device 100, a conversion is performed and the text layout is re-rendered from a left-to-right format to a right-to-left format in message 508 using the process discussed above.

Figure 6:
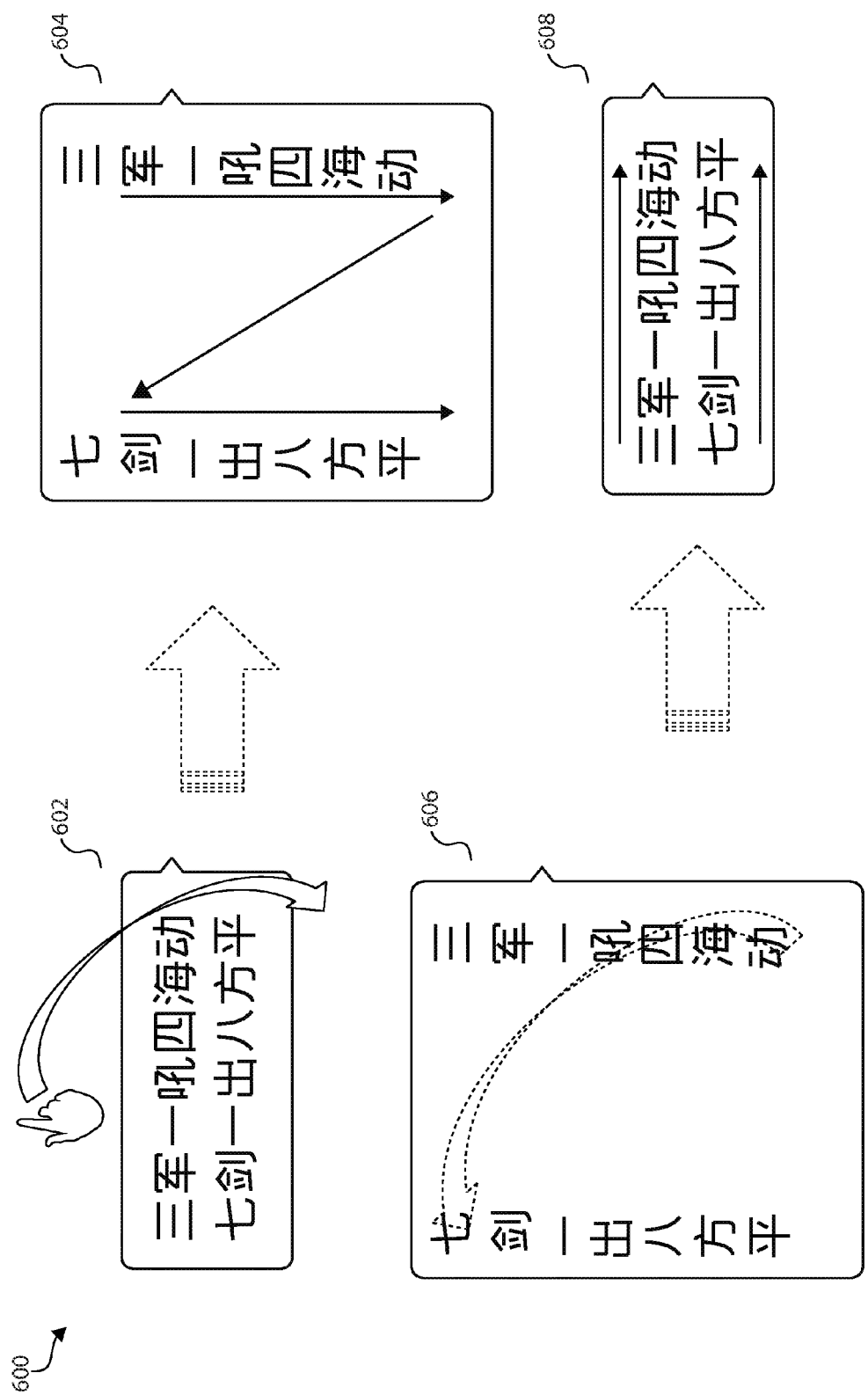
FIG. 6 is an additional block diagram illustrating gesture patterns for real-time text layout conversion control in accordance with various aspects of the present invention.

FIG. 6 is an additional block diagram illustrating gesture patterns 600 for real-time text layout conversion control. Message 602 shows that when a directional fingertip gesture movement is provided from top-left to right-bottom on the display 120 of the mobile electronic device 100, a conversion is performed and the text layout is re-rendered from a horizontal text format to a vertical text format in message 604 using the process discussed above. Similarly, message 606 shows that when a directional fingertip gesture movement is provided from bottom-right to top-left on the display 120 of the mobile electronic device 100, a conversion is performed and the text layout is re-rendered from a vertical text format to a horizontal text format in message 608 using the process discussed above.

Figure 7:
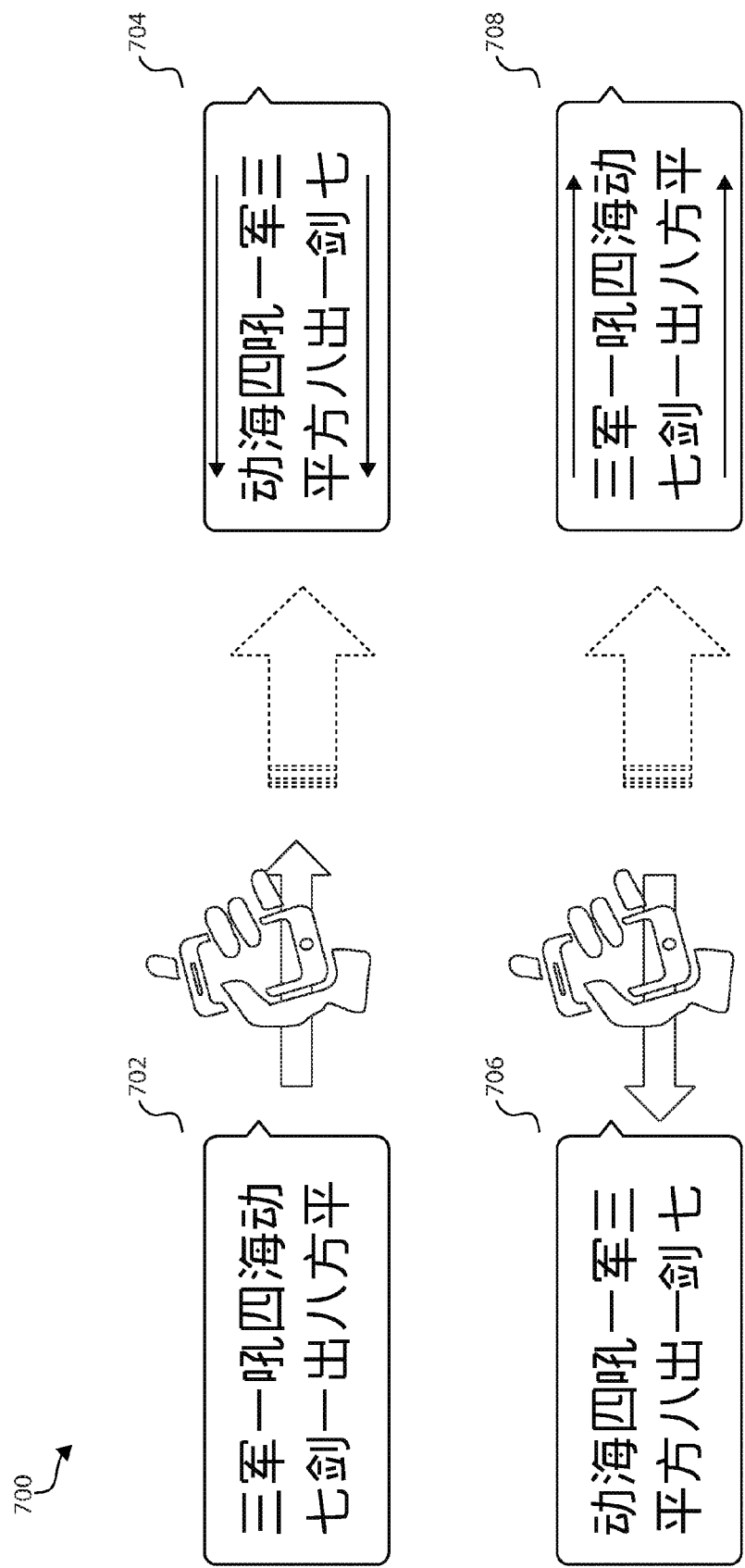
FIG. 7 is an additional block diagram illustrating gesture patterns for real-time text layout conversion control in accordance with various aspects of the present invention.

FIG. 7 is an additional block diagram illustrating gesture patterns 700 for real-time text layout conversion control. Message 702 shows that when a directional shake gesture movement is provided from left-to-right of the mobile electronic device 100, a conversion is performed and the text layout is re-rendered from a right-to-left format to a left-to-right format in message 704 using the process discussed above. Similarly, message 706 shows that when a directional shake gesture movement is provided from right-to-left of the mobile electronic device 100, a conversion is performed and the text layout is re-rendered from a left-to-right format to a right-to-left format in message 708 using the process discussed above.

Figure 8:
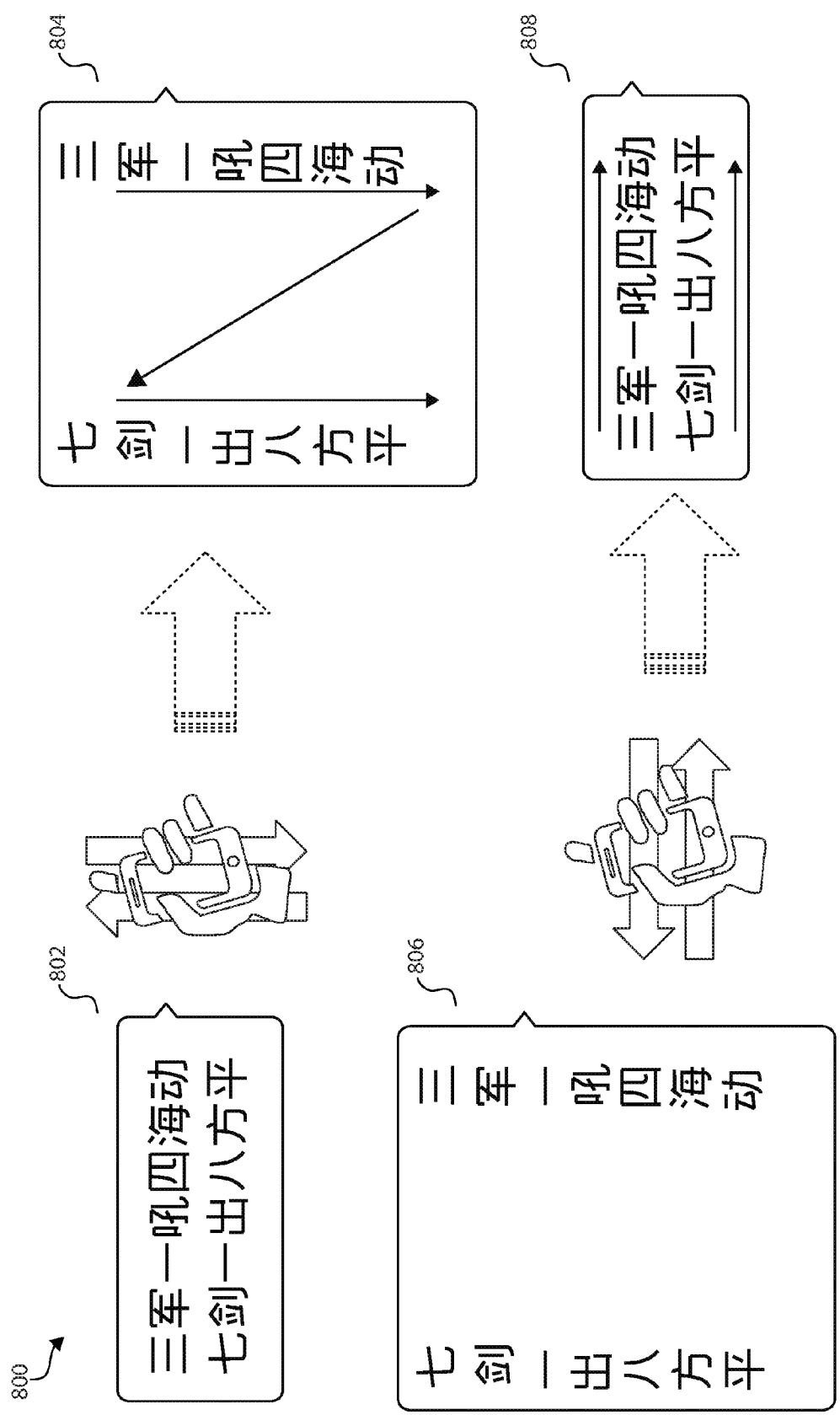
FIG. 8 is still an additional block diagram illustrating gesture patterns for real-time text layout conversion control in accordance with various aspects of the present invention.

FIG. 8 is still an additional block diagram illustrating gesture patterns 800 for real-time text layout conversion control. Message 802 shows that when a directional shake gesture movement of an up-and-down action of the mobile electronic device 100, a conversion is performed and the text layout is re-rendered from a horizontal text format to a vertical text format in message 804 using the process discussed above. Similarly, message 806 shows that when a directional shake gesture movement of a side-to-side action of the mobile electronic device 100, a conversion is performed and the text layout is re-rendered from a vertical text format to a horizontal text format in message 808 using the process discussed above.

The present invention may be an apparatus, a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmissions, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

What is claimed is:

1. A method for real-time text layout conversion control on a mobile electronic device, by a processor device, the method comprising:
    on a mobile electronic device having a touch-screen display, defining a set of text layout conversion control signals associated with at least one of a plurality of contextual attributes, for text layout conversion management; and
    upon recognition of the at least one of the plurality of contextual attributes and proactively upon receiving a message, prior to the message being displayed, dynamically converting and re-rendering, in real-time commensurate with the recognized at least one of the plurality of contextual attributes, a text layout within a social messaging application executing on the mobile electronic device for presentation on the touch-screen display; wherein the at least one of the plurality of contextual attributes comprise each of a geo-location and a text content of the message received through the social messaging application.

2. The method of claim 1, wherein dynamically converting and re-rendering the text layout comprises re-rendering text from a horizontal text layout to a vertical text layout.

3. The method of claim 1, further including detecting the at least one of the plurality of contextual attributes by a conversion control recognition daemon, the conversion control recognition daemon passing the at least one of the plurality of contextual attributes to a conversion agent.

4. The method of claim 3, further including receiving, by the conversion agent, the at least one of the plurality of contextual attributes and searching the set of text layout conversion control signals to match a corresponding contextual attribute with a given defined text layout conversion control signal.

5. The method of claim 4, further including using the matched corresponding contextual attribute with the given defined text layout conversion control signal to send, by the conversion agent, a specific text layout change command to a text layout re-renderer.

6. The method of claim 5, further including converting and re-rendering the text layout for presentation on the touch-screen display by redrawing the text layout based upon the specific text layout change command.

7. A system for real-time text layout conversion control on a mobile electronic device, the system comprising:
   a mobile electronic device having a touch-screen display and at least one processor device, wherein the at least one processor device:
      defines a set of text layout conversion control signals associated with at least one of a plurality of contextual attributes, for text layout conversion management; and
      upon recognition of the at least one of the plurality of contextual attributes and proactively upon receiving a message, prior to the message being displayed, dynamically converts and re-renders, in real-time commensurate with the recognized at least one of the plurality of contextual attributes, a text layout within a social messaging application executing on the mobile electronic device for presentation on the touch-screen display; wherein the at least one of the plurality of contextual attributes comprise each of a geo-location and a text content of the message received through the social messaging application.

8. The system of claim 7, wherein dynamically converting and re-rendering the text layout comprises re-rendering text from a horizontal text layout to a vertical text layout.

9. The system of claim 7, wherein the at least one processor device detects the at least one of the plurality of contextual attributes by a conversion control recognition daemon, the conversion control recognition daemon passing the at least one of the plurality of contextual attributes to a conversion agent.

10. The system of claim 9, wherein the at least one processor device receives, by the conversion agent, the at least one of the plurality of contextual attributes and searches the set of text layout conversion control signals to match a corresponding contextual attribute with a given defined text layout conversion control signal.

11. The system of claim 10, wherein the at least one processor device uses the matched corresponding contextual attribute with the given defined text layout conversion control signal to send, by the conversion agent, a specific text layout change command to a text layout re-renderer.

12. The system of claim 11, wherein the at least one processor device converts and re-renders the text layout for presentation on the touch-screen display by redrawing the text layout based upon the specific text layout change command.

13. A computer program product for real-time text layout conversion control on a mobile electronic device, by a processor device, the computer program product embodied on a non-transitory computer-readable storage medium having computer-readable program code portions stored therein, the computer-readable program code portions comprising:
   an executable portion that, on a mobile electronic device having a touch-screen display, defines a set of text layout conversion control patterns associated with at least one text layout input control signal, for text layout conversion management; and
   an executable portion that, upon detection of the at least one text layout input control signal and proactively upon receiving a message, prior to the message being displayed, dynamically converts and re-renders, in real-time commensurate with the recognized at least one of the plurality of contextual attributes, a text layout within a social messaging application executing on the mobile electronic device for presentation on the touch-screen display; wherein the at least one of the plurality of contextual attributes comprise each of a geo-location and a text content of the message received through the social messaging application.

14. The computer program product of claim 13, wherein dynamically converting and re-rendering the text layout comprises re-rendering text from a horizontal text layout to a vertical text layout.

15. The computer program product of claim 13, further including an executable portion that detects the at least one of the plurality of contextual attributes by a conversion control recognition daemon, the conversion control recognition daemon passing the at least one of the plurality of contextual attributes to a conversion agent.

16. The computer program product of claim 15, further including an executable portion that receives, by the conversion agent, the at least one of the plurality of contextual attributes and searches the set of text layout conversion control signals to match a corresponding contextual attribute with a given defined text layout conversion control signal.

17. The computer program product of claim 16, further including an executable portion that uses the matched corresponding contextual attribute with the given defined text layout conversion control signal to send, by the conversion agent, a specific text layout change command to a text layout re-renderer.

18. The computer program product of claim 17, further including an executable portion that converts and re-renders the text layout for presentation on the touch-screen display by redrawing the text layout based upon the specific text layout change command.

* * * * *